United States Patent
Liu

(10) Patent No.: US 11,146,596 B1
(45) Date of Patent: Oct. 12, 2021

(54) CLIENT-SPECIFIC CONTROL OF SHARED TELECOMMUNICATIONS SERVICES

(71) Applicant: 8×8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

(21) Appl. No.: 17/064,429

(22) Filed: Oct. 6, 2020

Related U.S. Application Data

(63) Continuation of application No. 16/559,093, filed on Sep. 3, 2019, now Pat. No. 10,805,356, which is a continuation of application No. 15/240,391, filed on Aug. 18, 2016, now Pat. No. 10,404,759.

(60) Provisional application No. 62/353,971, filed on Jun. 23, 2016.

(51) Int. Cl.
*G06F 15/16* (2006.01)
*H04L 29/06* (2006.01)

(52) U.S. Cl.
CPC ........ *H04L 65/102* (2013.01); *H04L 65/1059* (2013.01)

(58) Field of Classification Search
CPC .......................... H04L 65/102; H04L 65/1059
See application file for complete search history.

(56) References Cited

U.S. PATENT DOCUMENTS

| | | | |
|---|---|---|---|
| 5,312,016 A | 5/1994 | Brennan et al. | |
| 5,390,232 A | 2/1995 | Freeman et al. | |
| 6,304,649 B1 | 10/2001 | Lauzon et al. | |
| 6,314,402 B1 | 11/2001 | Monaco et al. | |
| 6,622,016 B1 * | 9/2003 | Sladek | H04Q 3/0054 455/414.1 |
| 6,643,362 B2 | 11/2003 | Hogan et al. | |
| 6,772,210 B1 | 8/2004 | Edholm | |
| 7,072,653 B1 * | 7/2006 | Sladek | H04W 8/20 455/432.3 |
| 7,274,684 B2 | 9/2007 | Young et al. | |
| 7,403,604 B2 | 7/2008 | Mundra et al. | |

(Continued)

FOREIGN PATENT DOCUMENTS

WO     0135579 A1     5/2001

OTHER PUBLICATIONS

"Cisco Hosted Unified Communications Services", Cisco Product Data Sheet, Jun. 18, 2007 (retrieved May 31, 2016) http://www.cisco.com/c/en/us/products/collateral/unified-communications/product_data_sheet0900aecd80670040.html.

(Continued)

*Primary Examiner* — Richard G Keehn
(74) *Attorney, Agent, or Firm* — Crawford Maunu PLLC

(57) ABSTRACT

Aspects of the present disclosure are directed to providing remote services for endpoint devices of a plurality disparate client entities. In an example embodiment, an apparatus includes a computing server configured to provide communications for a plurality of endpoint devices respectively associated with a plurality of disparate client entities according to and responsive to client-specific sets of control data. The apparatus also includes a processing circuit configured to adjust routing of the communications by the computing server, in response to call event data generated by the computing server, by generating the client-specific sets of control data for each client entity according to a respective set of directives.

18 Claims, 8 Drawing Sheets

(56) References Cited

U.S. PATENT DOCUMENTS

| | | | |
|---|---|---|---|
| 7,526,539 B1* | 4/2009 | Hsu | H04L 12/2818 709/203 |
| 7,702,792 B2 | 4/2010 | Shaffer et al. | |
| 7,711,094 B1 | 5/2010 | Olshansky et al. | |
| 7,933,385 B2 | 4/2011 | Dickinson et al. | |
| 8,064,909 B2 | 11/2011 | Spinelli et al. | |
| 8,656,417 B2 | 2/2014 | May | |
| 8,918,867 B1 | 12/2014 | Salour | |
| 8,948,358 B1 | 2/2015 | Rengarajan et al. | |
| 8,964,726 B2 | 2/2015 | Lawson et al. | |
| 9,065,917 B1 | 6/2015 | Taliancich et al. | |
| 9,137,127 B2 | 9/2015 | Nowack et al. | |
| 9,160,696 B2 | 10/2015 | Wilsher et al. | |
| 9,240,966 B2 | 1/2016 | Wilsher et al. | |
| 9,270,833 B2 | 2/2016 | Ballai et al. | |
| 9,294,433 B1 | 3/2016 | Salour | |
| 9,294,515 B2 | 3/2016 | Sayko | |
| 9,306,982 B2 | 4/2016 | Lawson et al. | |
| 9,332,119 B1 | 5/2016 | Danis | |
| 9,338,064 B2 | 5/2016 | Stratton et al. | |
| 9,344,573 B2 | 5/2016 | Wolthuis et al. | |
| 9,407,597 B2 | 8/2016 | Lawson et al. | |
| 9,426,116 B1 | 8/2016 | Salour | |
| 9,455,949 B2 | 9/2016 | Lawson et al. | |
| 9,456,008 B2 | 9/2016 | Lawson et al. | |
| 9,459,925 B2 | 10/2016 | Lawson et al. | |
| 9,459,926 B2 | 10/2016 | Shakirzyanov et al. | |
| 9,553,475 B2 | 1/2017 | Boysen, III et al. | |
| 9,553,755 B2 | 2/2017 | Anisimov et al. | |
| 2002/0141352 A1 | 10/2002 | Fangman et al. | |
| 2003/0128691 A1 | 7/2003 | Bergman et al. | |
| 2003/0131132 A1 | 7/2003 | Cheng et al. | |
| 2005/0084088 A1 | 4/2005 | Hamilton | |
| 2005/0095981 A1 | 5/2005 | Benco | |
| 2005/0164702 A1 | 7/2005 | Carlson et al. | |
| 2005/0283368 A1 | 12/2005 | Leung | |
| 2006/0031510 A1 | 2/2006 | Beck et al. | |
| 2006/0039354 A1* | 2/2006 | Rao | H04L 47/36 370/352 |
| 2006/0209797 A1 | 9/2006 | Anisimov et al. | |
| 2006/0221941 A1 | 10/2006 | Kishinsky et al. | |
| 2006/0264208 A1 | 11/2006 | Moon et al. | |
| 2006/0274723 A1 | 12/2006 | Siyavudeen et al. | |
| 2006/0291450 A1 | 12/2006 | Ramachandran et al. | |
| 2007/0041527 A1 | 2/2007 | Tuchman et al. | |
| 2007/0047531 A1 | 3/2007 | Malhotra et al. | |
| 2007/0047571 A1 | 3/2007 | Kandikonda et al. | |
| 2007/0091800 A1 | 4/2007 | Corcoran | |
| 2007/0115942 A1 | 5/2007 | Money et al. | |
| 2007/0189481 A1 | 8/2007 | Cadiz et al. | |
| 2007/0223446 A1 | 9/2007 | McMenamy et al. | |
| 2007/0232272 A1 | 10/2007 | Gonsalves et al. | |
| 2008/0002820 A1 | 1/2008 | Shtiegman et al. | |
| 2008/0063153 A1 | 3/2008 | Krivorot et al. | |
| 2008/0095339 A1 | 4/2008 | Elliott et al. | |
| 2008/0096504 A1 | 4/2008 | Linkola et al. | |
| 2008/0102844 A1 | 5/2008 | Zhu et al. | |
| 2008/0125077 A1 | 5/2008 | Velazquez et al. | |
| 2008/0175230 A1* | 7/2008 | Brand | H04M 7/006 370/352 |
| 2009/0003574 A1* | 1/2009 | Schneider | H04L 29/06027 379/201.12 |
| 2009/0023450 A1 | 1/2009 | George et al. | |
| 2009/0086950 A1 | 4/2009 | Vendrow et al. | |
| 2009/0129374 A1* | 5/2009 | Yurchenko | H04L 65/605 370/352 |
| 2009/0129581 A1 | 5/2009 | Kambli et al. | |
| 2009/0201916 A1 | 8/2009 | Caron et al. | |
| 2009/0203375 A1 | 8/2009 | Gisby et al. | |
| 2009/0238169 A1 | 9/2009 | Dalrymple et al. | |
| 2009/0290701 A1 | 11/2009 | Portman et al. | |
| 2009/0296687 A1 | 12/2009 | Ramanathan et al. | |
| 2010/0128709 A1 | 5/2010 | Liu et al. | |
| 2010/0131078 A1* | 5/2010 | Brown | G05B 19/409 700/17 |
| 2010/0142516 A1 | 6/2010 | Lawson et al. | |
| 2010/0232594 A1 | 9/2010 | Lawson et al. | |
| 2010/0267374 A1 | 10/2010 | Armstrong et al. | |
| 2011/0119157 A1 | 5/2011 | Sivanathan et al. | |
| 2011/0170681 A1 | 7/2011 | Kole et al. | |
| 2011/0182418 A1 | 7/2011 | Anisimov et al. | |
| 2011/0302557 A1 | 12/2011 | Tatsubori | |
| 2011/0320550 A1 | 12/2011 | Lawson et al. | |
| 2012/0069131 A1* | 3/2012 | Abelow | G06Q 10/067 348/14.01 |
| 2012/0208495 A1 | 8/2012 | Lawson et al. | |
| 2012/0304245 A1 | 11/2012 | Lawson et al. | |
| 2013/0072153 A1 | 3/2013 | Lawson et al. | |
| 2013/0212603 A1 | 8/2013 | Cooke et al. | |
| 2013/0237287 A1 | 9/2013 | Ferren et al. | |
| 2013/0238338 A1 | 9/2013 | Kharod et al. | |
| 2013/0290494 A1* | 10/2013 | Goudarzi | H04L 65/1093 709/219 |
| 2013/0304929 A1 | 11/2013 | Fahlgren et al. | |
| 2013/0339464 A1* | 12/2013 | Goudarzi | H04L 67/14 709/206 |
| 2014/0044123 A1 | 2/2014 | Lawson et al. | |
| 2014/0105372 A1 | 4/2014 | Nowack et al. | |
| 2014/0173078 A1 | 6/2014 | McCord | |
| 2014/0229289 A1 | 8/2014 | Rao et al. | |
| 2014/0270109 A1 | 9/2014 | Riahi | |
| 2014/0331060 A1 | 11/2014 | Hayton | |
| 2015/0085997 A1 | 3/2015 | Biage et al. | |
| 2015/0135167 A1 | 5/2015 | Berk et al. | |
| 2015/0193234 A1 | 7/2015 | Udayakumaran et al. | |
| 2015/0331727 A1 | 11/2015 | Mameri et al. | |
| 2016/0080220 A1 | 3/2016 | Winningham | |
| 2016/0134757 A1 | 5/2016 | Ballai et al. | |
| 2016/0277587 A1 | 9/2016 | Alexander et al. | |
| 2016/0295017 A1 | 10/2016 | Zgardovski et al. | |
| 2016/0350204 A1 | 12/2016 | Conlon et al. | |
| 2016/0352790 A1* | 12/2016 | Hollingsworth | H04L 67/18 |
| 2016/0360033 A1 | 12/2016 | Kocan | |
| 2017/0070540 A1 | 3/2017 | Combellas et al. | |
| 2017/0142256 A1 | 5/2017 | Bjorsell et al. | |
| 2017/0187877 A1 | 6/2017 | Smith et al. | |
| 2017/0262265 A1 | 9/2017 | Kellicker et al. | |

OTHER PUBLICATIONS

USPTO. Final Office Action dated Dec. 21, 2018, for copending U.S. Appl. No. 15/491,511, to Applicant (8×8, Inc.).

\* cited by examiner

CLIENT-SPECIFIC CONTROL OF SHARED TELECOMMUNICATIONS SERVICES

OVERVIEW

Aspects of various embodiments are directed to communication and computing services. Voice over Internet Protocol (VoIP) and other telecommunications platforms have allowed individuals to make telephone calls using broadband Internet connections in place of traditional telephone lines. A VoIP endpoint device can use a broadband Internet connection to connect to a VoIP server that is managed by a VoIP service provider. The VoIP server can handle call routing and provide other VoIP services for the VoIP endpoint device.

Computing servers are increasingly being used to provide various services over a network including, but not limited to, VoIP communication services such as VoIP calls, video conferencing, call exchange servers, and packet switching, and traffic management as well as non-VoIP services including but not limited to, website hosting, remote data storage, remote computing services, virtual computing environments. For ease of reference, the various applications, systems and services that may be provided by computing servers may be collectively referred to as remote services.

SUMMARY

Various example embodiments are directed to issues such as those addressed above and/or others which may become apparent from the following disclosure concerning systems and methods for providing remote services for endpoints.

In an example embodiment, an apparatus includes a VoIP communications server configured to provide voice and data communications for a plurality of endpoint devices associated with respective ones of a plurality of disparate client entities. The VoIP communications server may provide the voice and data communications, for example, by setting up VoIP communications service relationships with a plurality of disparate client entities, controlling call routing or data processing decisions for communications between each of different sets of endpoint devices respectively associated with each of the plurality of disparate client entities, and providing VoIP communications based on the VoIP communications service relationships. The apparatus also includes a processing circuit configured to, for each of the plurality of disparate client entities, communicate with the VoIP communications server by generating client-specific sets of data indicative of client-specific communications routing and/or client-specific communications data, and by conveying the generated client-specific sets of data over an interface protocol platform. The VoIP communications server and each of the plurality of disparate client entities are configured and arranged with the interface protocol platform. The interface protocol platform is designed to facilitate permissible types of communications by characterizing a manner in which the client-specific sets of data are provided from each of the plurality of disparate client entities to the VoIP communications server, and by prompting the VoIP communications server to interpret and use the client-specific sets of data to modify call routing or data processing decisions performed by the VoIP communications server.

In another example embodiment, an apparatus includes a computing server configured to provide VoIP communications for a plurality of endpoint devices. Each endpoint device is respectively associated with an account of a respective one of a plurality of disparate client entities. In an example implementation, the computing server provides the VoIP communications by routing VoIP calls for the endpoint of each of the plurality of disparate client entities according to and responsive to client-specific sets of control data and by generating call event data for the routed VoIP calls. The apparatus also includes a processing circuit configured to adjust routing of the VoIP calls by the computing server according to a respective set of directives for each client entity. In an example implementation, the processing circuit adjusts routing of the VoIP calls by receiving the call event data from the computing server and, in response to the call event data, generating the client-specific sets of control data for each client entity according to a respective set of directives for the client entity.

In another example embodiment, an apparatus includes a computing server configured to provide one or more remote services for a plurality of endpoint devices. Each endpoint device is respectively associated with an account of a respective one of a plurality of disparate client entities. In an example implementation, the remote services are provided by generating and routing data for the endpoint devices. The apparatus also includes a processing circuit communicatively coupled to the computing server and configured to adjust the remote services provided for the plurality of endpoint devices according a respective set of directives for the client entity. In an example implementation, the processing circuit adjusts the remote services by monitoring operations of the computing server and, in response to the call event data, generating the client-specific sets of control data for each client entity according to a respective set of directives for the client entity.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
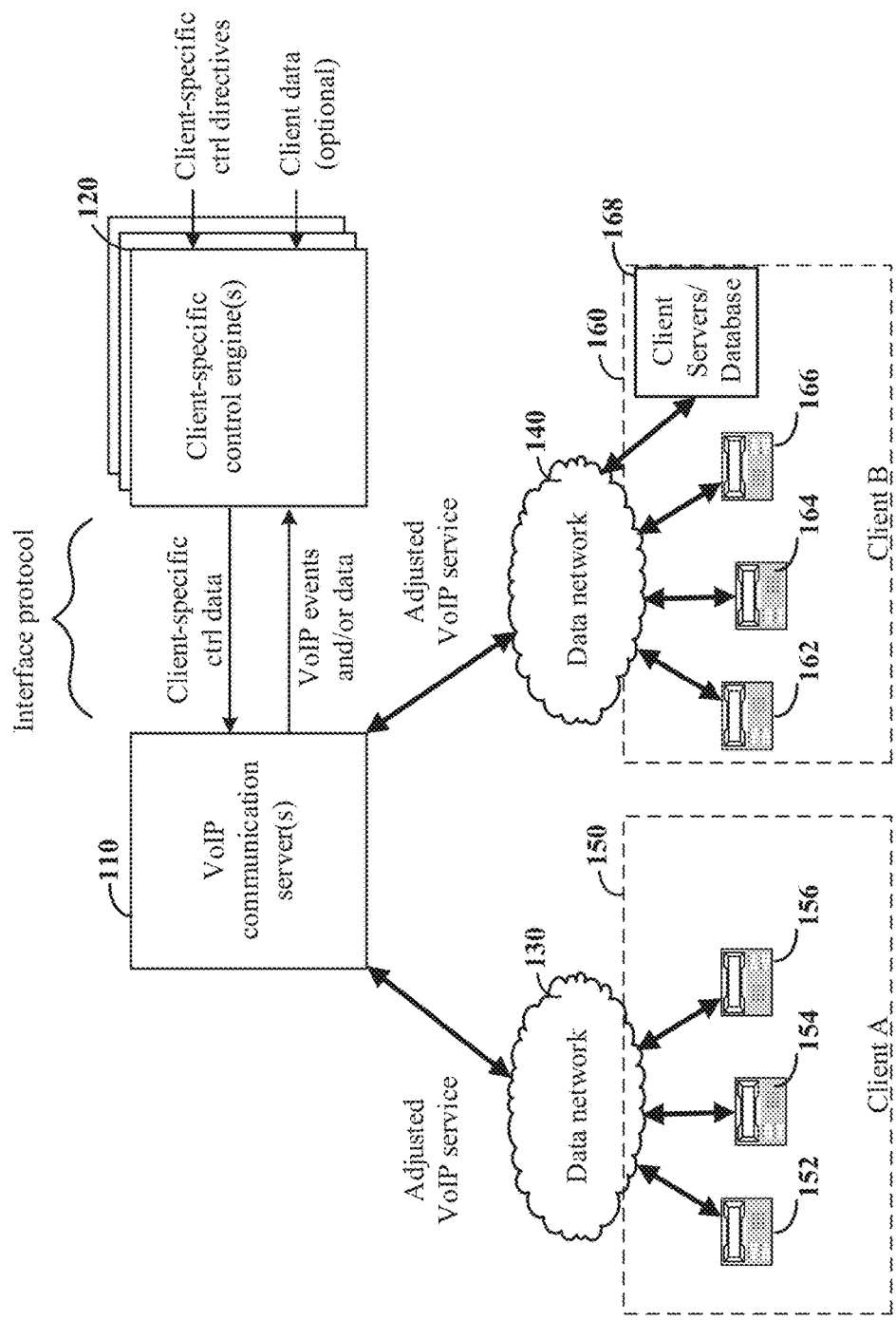
FIG. 1 shows a block diagram of a system for providing VoIP communication for endpoints of a plurality of client accounts, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving providing remote services for endpoint devices associated with a plurality of different client accounts. In certain implementations, aspects of the present disclosure have been shown to be beneficial when used in the context of providing VoIP communication services. While the disclosure is not necessarily limited to VoIP systems, platform and/or services, VoIP systems as a PaaS is used in the following discussion to exemplify certain specific advantageous embodiments.

Some remote service providers customize their services for different customers. This might include customizable auto attendants, call routing, call forwarding, voicemail, or other features. For particularly large clients with many different telephone accounts and numbers, implementing and updating these types of customizations can be a significant undertaking. Certain embodiments of the present disclosure are directed toward an interface that allows client-specific control engine to access and dynamically adjust the manner in which remote services are provided for the users of a client account during operation, while maintaining the integrity and security of the underlying system for providing the remote services. As an illustrative example, a VoIP communication system may be configured to allow a client-specific control engine to dynamically modify and control the call flow and processing at all levels within the system, via the interface, including (re)routing of incoming calls to different internet protocol private branch exchanges (IP-BXs). An IPBX is a telephone system that switches calls between enterprise users on local lines while allowing all users to share a certain number of external phone lines. External phone lines are telephone lines that are supported by telephone carriers as being individually addressable within the PSTN. For example, an IPBX can use extensions to direct calls to many phones after a caller first makes a call to a shared number. As another example, an IPBX can provide direct Inward Dialing (DID). DID is a service where a telephone carrier provides a block of telephone numbers that are each routed to an IPBX system rather than to individual telephone lines. Using DID, individual phone numbers can be provided to each person or workstation without separate physical lines into the IPBX for each possible connection.

Additionally or alternatively, certain embodiments allow the client-specific control engine to interface with data sources that are either part of the underlying system or external to the server providing the remote services. The ability to access the dynamic control mechanisms of the underlying remote services, via the interface, can provide a platform that is both flexible and simple to implement from the viewpoints of both the VoIP provider and the customers of the VoIP provider.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to VoIP communication servers configured to provide VoIP communication services for endpoints of a plurality of different client accounts. It is understood that the various examples may be adapted for use with computing servers configured to provide various other remote services, including but not limited to, website hosting, remote data storage, remote computing services, virtual computing environments, enterprise communications as a service, virtual contact center, and other services, which are commercially-available by 8×8, Inc. (see https://www.8x8.com/).

In an example embodiment, a communication system includes a one or more VoIP communication server configured to provide VoIP communications for endpoint devices of a plurality of client accounts. The endpoint devices may include VoIP-enabled devices (e.g., IP phones, smart phones, tablets, and/or desktop computers with appropriate VoIP software applications) and/or non-VoIP endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the VoIP communication server(s). Registered devices for each client account may be specified in a respective account settings file accessible by the VoIP communication server(s).

In different embodiments, the VoIP communication server(s) may provide VoIP communications using various processes and circuits. As one example, the VoIP communication server(s) may provide VoIP communications by 1) routing and establishing VoIP calls for the endpoint of each of the plurality of disparate client entities according to and responsive to client-specific sets of control data, and 2) generating call event data for the routed VoIP calls. A particular example of a VoIP server may use session initiation protocol (SIP) to handle various call functions (e.g., call setup and tear down). However, the various embodiments discussed herein are not necessarily limited thereto. Consistent with the above and in other embodiments disclosed herein, the VoIP servers can be configured to establish a leg of the call from the VoIP endpoint devices (or dial peers) to another VoIP endpoint device or to a gateway.

In various embodiments, the communication system includes one or more processing circuits configured to implement client-specific control engines configured to dynamically adjust the VoIP communications provided for a respective client account via an interface. For example, the client-specific control engines may generate client-specific control data by processing a respective set of control directives for the client account. The control directives may be customized by each client to customize dynamic adjustments of VoIP services to be performed for VoIP calls of endpoints of the client account.

In certain embodiments, the client-specific control engines provide client-specific control data to the VoIP server(s) via an interface protocol platform that characterizes the format in which the client-specific sets of data are communicated to the VoIP server. According to various embodiments, data is communicated via the interface protocol platform using high-level programming language instruction set. The high-level programming language instruction set allows a programmer access to the VoIP communications server(s) (or PaaS computing server(s) providing remote services) by way a controlled and limited set of call control operations and functions. The limitations on the operations can be particularly useful for allowing programming control to be placed into the hands of different customers of the provider of the VoIP servers. For example, the provider can update or make other changes to how the VoIP servers are configured without requiring modification to documents written to use the high-level language, which might otherwise be required to account for the changes. Moreover, the VoIP servers and their data can be protected from poor programming decisions (intentional or otherwise) by tightly controlling the extent that the documents provide control or access the inner workings of the VoIP servers.

Consistent with the above-characterized embodiments, at the client side of the VoIP communications services, the client's computer-based processing (e.g., by the client-specific control engine) generates and submits control (routing/data-communication) directives for assessment and use by the VoIP communications service provider. In a typical implementation, these directives can be realized using codes or one or more commands (or a script of program-created commands). As examples, such codes or command sets can be implemented using a variety of programming control approaches. These approaches include, for example, a programming language (such as C++, XML, JAVA, HTLM, SQL, etc.) common to both the client-specific control engine and to the VoIP communications service provider, which receives the directives (submitted from the client side) for adjusting the VoIP communications services being provided to the submitting client. In some implementations, look-up tables with codes/commands as entries can be used by the client engines each time a service change is needed. The entries can be pre-generated by the service provider for use by the client, manually entered by either the client or an installer, and/or generated by logic circuitry (such as implemented in hosted FPGA fabric). For instance, entries may be generated by logic circuitry based on a set of limited assumptions and conditions applicable to that specific type of client and its service expectations/subscription (e.g., no more than 10 extension phone lines in any designated geographic region, only 2 designated extension lines permitted to videoconference, etc.)

For many less-complex applications/client needs, a hardware accelerated decision making circuit (e.g., logic circuitry implemented in hosted FPGA fabric) can be tailored specifically for the types of data information and call-routing decisions needed by the submitting client in real time and dynamically as the VoIP communications service provider authenticates the client and its submitted control directives. For example, a client may have an increasing number of branches or franchise offices, each with only 1-2 videophones/smart-terminals requiring minimal video/audio services. For each such office, the client-specific engine (in the form of a hardware accelerated decision making circuit) is configured and arranged to execute functionality, which is specific to obtaining and assigning phone numbers (as part of the client's PBX packaged telephony services). The submitted control directives result in the VoIP communications service provider modifying the actual services provided to the client, in dynamic fashion and in a manner consistent with the client's ongoing needs. The communications, which can include land-line and/or requests for PBX numbers, to the VoIP communications service provider are verified in each instance for client identification and the client-based subscription status for the relevant services.

By using a common interface protocol (e.g., the programming language, codes or command sets) which is understood by the VoIP communications service provider, authentication and updating for added (telephony) services is readily achieved automatically and remotely without burdening the VoIP communications service provider with cost-intensive set up procedures. Depending on the level of services being added/changed for each client, and/or depending on the client's manual-operator and/or automated technology, the control directives can be generated and submitted in various (coded) ways such as described above and also, for example, by dial tone input generated remotely on behalf of each client, by smartphone app specific to the client, by voice recognition, or combinations thereof. The client engine can also prompt the user to effect and select decisions upon certain client-generated or provider-prompted events. Consistent with the instant disclosure, control directives can be generated by the client (and/or client engines) based on various criteria/parameters On the control side (away from the client(s)), the VoIP communications service provider can control the number and frequency of directive submissions from the client-specific engines (respectively sent from each client) by polling the clients periodically (and/or permitting selective interruptions (of the routine polling)) to update the decision engine used by the VoIP communications service provider. In such embodiments, the client can polled for possible updates, or interrupt for such updates, on demand and/or in real time.

According to particular embodiments, a client-specific control engine can send requests to a Web server and get control directive responses for processing, thereby operation in a stateless manner that is similar to HTML/Internet browser. The client-specific control engine can interpret the received control directives and render (execute) building blocks. Each building block can define functions relating to voice, call control, and flow control logic. The client-specific control engine may also execute other types of code, such as Javascript, to create dynamic content for client-side flow control. A control directives document may have URL links to a web server for iterative processing, or it may include query requests for retrieving data from various sources. A query could be formatted for consistency with the source of the data (e.g., by using JavaScript Object Notation (JSON)

to retrieve data from third party application servers or from the VoIP server provider's cloud database). This information can then be used to drive call flow or call control decisions.

In various embodiments, flow control decisions that are based upon code running on the client side or on the server side. As non-limiting examples, a client side computer system could run code that is written using Javascript or TCL while a server-side computer system might run code that is written using PHP, NodeJS, Python, Scala, Ruby, .Net, or other web languages. For example, a customer can write Javascript applications that are configured to receive call event notifications from the VoIP servers and to generate client specific control data responses that are provided back to the VoIP servers. In some embodiments, a client-specific control engine may generate queries to various databases, whether the database is controlled by the client or VoIP provider.

Consistent with certain embodiments, the call control engine and high-level programming language interface may provide options that allow for authorization and authentication services to be accessed and used as part of the call control functions. For example, the high-level programming language can be used to direct the call control engine to access an authentication server that performs verification (and grant) of access rights for certain databases or services.

According to embodiments of the present disclosure, the VoIP servers can be configured to use different high-level programming languages for different functions, where each programming language has a different set of commands. For example, a first high-level programming language can be used to create documents that control call routing decisions for high volumes of call traffic, as might occur at the edge of a VoIP provider's system. These call routing decisions can, for example, identify a particular branch office or an IPBX of a particular customer. The identified IPBX might then have additional documents written to communicate using a second high-level programming language that is tailored toward more specific call processing capabilities that might be associated with a particular account or another identifiable grouping. The distinction between the two programming languages can be particularly useful in terms of improving the scalability of the system. For instance, the language used for call routing decisions can be relatively light weight, with fewer commands and capabilities. In particular implementations, the first (call routing) language can contain a subset of the commands available in the second (call processing) language.

Various embodiments of the present disclosure are directed toward VoIP servers that are designed to provide options for dynamically updating and accessing control directive documents using the high-level programming language. For instance, the VoIP servers can be configured to facilitate uploading of new control directive documents as desired by a customer. Consistent with certain embodiments, the VoIP servers can be configured to allow for complex hierarchal solutions that can improve scalability of the system. For example, call control decisions that are shared between certain groups of accounts can share a common template control directive document that can be updated once for all of the groups. The shared control directive document can call link to other control directive documents that are specifically tailored to individual accounts in order to provide individual customizable options. Consistent with some embodiments, there can be multiple levels of shared control directive documents and scripts. For example, a first template control directive document might specify call processing functionality for an entire company. A second set of template control directive documents could be used at a country level (e.g., one template control directive document for the United States and one template control directive document for Canada). A third set of template control directive documents could then be used for each branch or store of the company. Finally, individual control directive documents could be used for each individual account. The shared, higher-level files can be updated once for a potentially large number of individual accounts, while still providing a level of individual configurability for each of the accounts.

According to various embodiments, the high-level, domain-specific programming language(s) are defined using a markup language as the basis for the language structure. More particular embodiments use extensible markup language (XML). An XML model defines the constraints on the high-level language, including defining the set of valid commands that can be carried out by the VoIP servers. Within these constraints, a customer can write XML code that self-describes the building blocks used in the customer's particular application. Another aspect of the call processing XML is that it allows for various different data structures to be embedded into the XML document or file. For example, a script written in Javascript can be embedded as character data that the VoIP servers are configured to identify and execute. Unless otherwise stated, the use of XML in connection with various embodiments does not necessarily limit the corresponding embodiments, such as limiting the embodiments to the use of only an XML-based language(s).

As described in more detail with reference to the figures, one or more client-specific control engine(s) and/or control directives may be configured to adjust provided services, acquire data metrics and/or analytics, and/or trigger various other action at multiple organizational levels of a client. In some embodiments, different sets of control directives may be used to control from different remote services at different levels and/or gather or gather data metrics from different sources at different levels. Data metrics gathers from one level and/or analytics derived therefrom may be used by control directives to control remote services provided for a different level of the client.

As one illustrative example, a fitness company Fitness Inc. may have a large number of fitness locations that are independently run by different franchisees. The company as a whole may which to have a first set of control directives configured to adjust one or more remote services company wide to present a uniform consistent image to the public. For example, control directives may be configured to provide the same automated email responses (when out of office) regardless of which franchisee employee is email. However, as different locations are independently operated, different franchisees may have different preferences or need regarding which and how remote services are provided. For example, different franchisees may have different hours or provide different services requiring different automated call interface and/or voice mail options. For instance, one franchisee may have a call menu option to schedule personal training, physical therapy and/or massage sessions, while another may not.

As another illustrative example, various remote services may be provided for company having a physical and online presence, such as a company providing formal wear clothing rental. Control directives may be configured by the company to cross correlate service provides via a website hosted via a cloud-based computing server, VoIP and email services provided for retail locations, and VoIP and email services provided for partnered companies (e.g., local measurement and tailor companies and/or shipping companies).

As yet another illustrative example, various remote services may be provided for a national restaurant chain. As described with reference to Fitness Inc. the restaurant may have a large number of franchise locations requiring franchisee customized services while maintaining a uniform public appearance. Additionally or alternatively, control directives may be configured to cross correlate data metrics acquired at each restaurant from local services for each restaurant including, for example, electronic reservation systems, security systems, mobile and/or fixed point of sale devices, electronic inventory tools and/or billing systems with data metrics acquired from company-wide remote services, e.g., ordering stock and/or shipment tracking services). Data metrics and/or analytics acquired from the cross correlation may be used to improve control over various local or company-wide remote services and/or trigger additional actions (e.g., email and/or alert to particular users).

Turning now to the figures, FIG. 1 shows a block diagram of a system for providing VoIP communication for endpoints of a plurality of client accounts, consistent with embodiments of the present disclosure. The system includes a computing server 110 configured to provide VoIP communications for a plurality of endpoint devices 152, 154, 156, 162, 164, and 166 connected in one or more data networks 130 and 140. The endpoint devices may include VoIP-enabled devices (e.g., IP phones, smart phones, tablets, and/or desktop computers with appropriate VoIP software applications) and/or non-VoIP endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the VoIP communication server. Registered devices for each client account may be listed in a respective account settings file (not shown) stored by the VoIP communication servers 110. In this example, endpoint devices 152, 154, and 156 are associated with in an account 150 for a first client A and endpoint devices 162, 164, and 166 are associated with in an account 160 for a second client B.

The system includes one or more processing circuits configured to implement client-specific control engines 120, which are configured to adjust the VoIP communications provided for each client account according to a respective set of control directives. For instance, the client-specific control engines 120 may adjust routing of a VoIP call for a client account by generating client-specific sets of control data to the VoIP communication server 110. For example, the client-specific control engines 120 may generate client-specific sets of control data by processing the respective set of control directives for the account in response to VoIP call event data or other data prompts received from the VoIP communication server(s) 110. For instance, the control directives for a client account may be configured to adjust routing of a particular VoIP call in response to call event data indicating a new incoming call to an endpoint of the client account.

Different embodiments may process the control directives differently to make control decisions for the client. For instance, in some embodiments, the control directives may be executed on a processor. Additionally or alternatively, control directives may be specified using a high-level programing language that is compiled and executed in a virtual language environment (e.g., Java). Additionally or alternatively, control directives may be specified in a look up table that is accessed in response to call events. Additionally or alternatively, the directives may describe circuits (e.g., in a hardware descriptive language) that are hardware accelerated by implemented the circuit in a field programmable gate array.

The control directives for a client account may generate the client-specific sets of control data based on various data metrics including, for example, VoIP call events or data received from the VoIP communication server, user input (e.g., input via dial-tones and/or GUI), data acquired from a client (e.g., from a client database), and/or data provided by third parties (e.g., third party monitoring services). The client-specific control engines 120 communicate the client-specific control data to the VoIP communication server(s) using an interface protocol having an instruction format that is independent of an instruction format used to implement the client specific control engines 120 and/or client-specific control directives. The independent instruction format of the interface protocol allows clients to write control directives including complex logic and various data sources, for example, using various different high-level languages without regard to the particular language used to implement of communicate with the VoIP computing server. For example, a set of control directives for a first client may be defined using a first instruction language that is different than a second instruction language used by a client-specific control engine to communicate with the VoIP server. A set of control directives for a second client may be defined using a third instruction language that is different than the first and second instruction languages. In some embodiments, the instruction set of the interface protocol may be configured to limit customer control over certain VoIP communication settings—thereby preventing clients from disrupting operations of the computing service with faulty client-specified directive code.

Different embodiments may implement the client-specific control engines 120 in various locations. For example, client-specific control engines 120 for one or more client accounts may be implemented in a central server connected to, or incorporated with, the VoIP communication server(s) 110. Additionally or alternatively, one or more client-specific control engine 120 may be implemented by one or more processing circuits maintained by the client (e.g., server/database 168). Similarly, the control directives may be stored locally within the client-specific control engines, or stored remotely (e.g., in a centralized database, in a database maintained by the client or a combination thereof).

Figure 2:
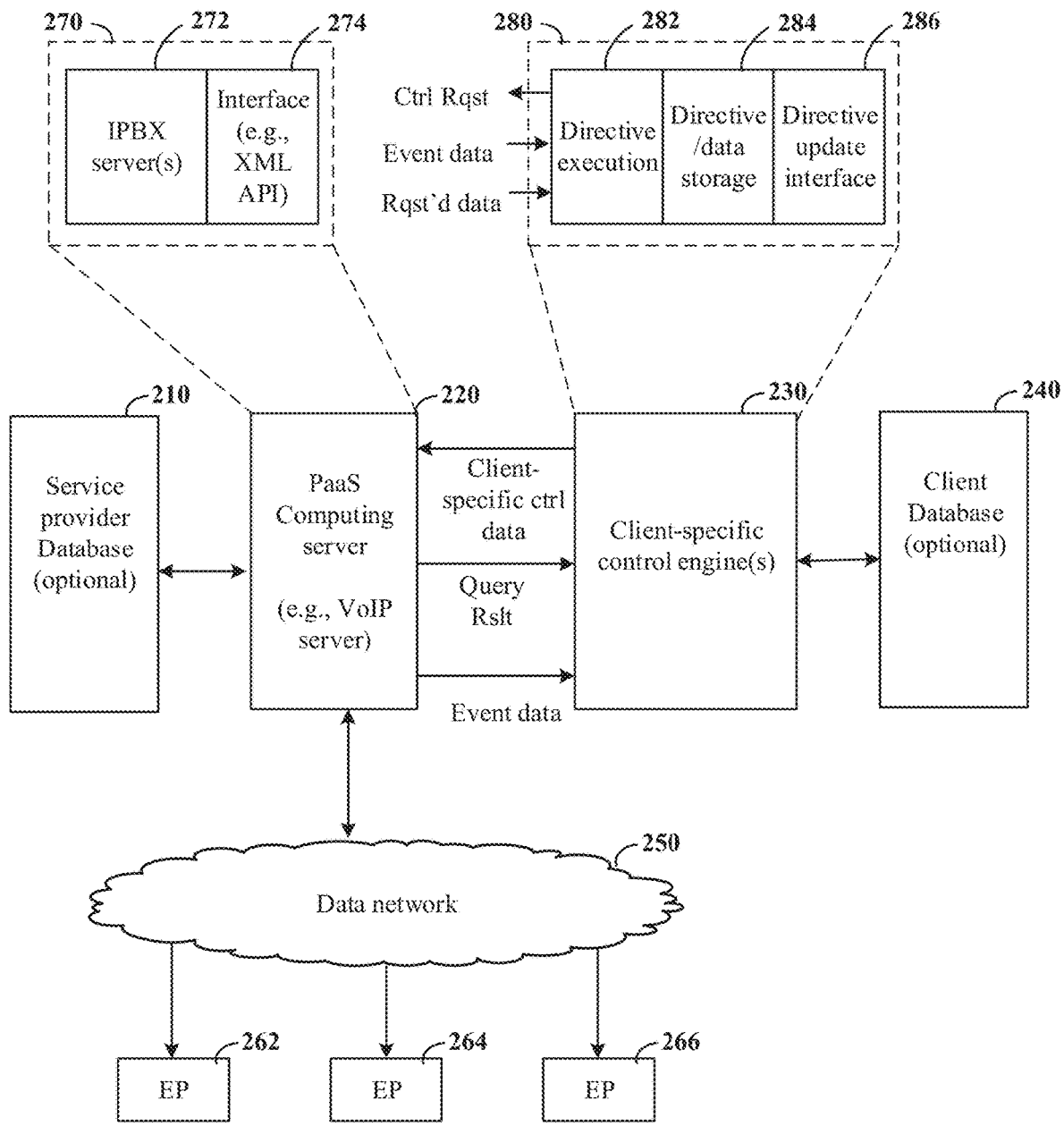
FIG. 2 shows a block diagram of a system for providing Platform as a Service (PaaS) remote services for endpoints of a plurality of client accounts, consistent with embodiments of the present disclosure.

As previously described, client-specific control engines may be used to facilitate adjustment of a variety of remote services including, for example, VoIP communication services such as VoIP calls, audio and/or video conferencing, IPBX exchange servers, packet switching, and traffic management as well as non-VoIP services including, but not limited to, website hosting, remote data storage, remote computing services, virtual computing environments. One or more of such services may be provided, for example, by a cloud computing network having one or more servers configurable to provide a PaaS for a plurality of clients. FIG. 2 shows a block diagram of an example system for providing PaaS remote services for endpoints of a plurality of client accounts, consistent with embodiments of the present disclosure. The system includes a PaaS computing server 220 configurable to provide one or more remote services for a plurality of endpoint devices 262, 264, and 266 connected in a data network 250. The endpoint devices may include VoIP-enabled devices (e.g., IP phones, smart phones, tables, and/or desktop computers) and/or non-VoIP endpoint devices (e.g., plain old telephone service (POTS) telephones and cellular-capable devices). Each endpoint device is respectively associated with an account of a respective client.

The system includes a processing circuit(s) configured to implement client-specific control engines 230. The client-specific control engines 230 are configured, as described with reference to client-specific control engines 120, to adjust the remote services (e.g., VoIP communications) provided for each client account according to a respective set of control directives. For instance, the client-specific control engines 230 may dynamically adjust settings for the remote services provided for a client by the PaaS computing server 220 according to the one or more sets of control directives specified for the client account.

As described with reference to FIG. 1, the control directives for a client account may generate the client-specific sets of control data based on various data metrics including for example, VoIP call events or data received from the VoIP communication server, data acquired from a client (e.g., from a client database), and/or data provided by third parties (e.g., third party monitoring services). In some embodiments, the control directives may cause the client-specific control engine 230 to query data from a client database 240 or from a service provider database 210. In some embodiments, the control directives may cause the client-specific control engine 230 to issue an analytics request specifying a particular evaluation of data in a database (e.g., 210 or 240). For example, client-specific control data communicated to the PaaS computing server 220 may prompt the PaaS computing server 220 to perform a particular analytical evaluation of data stored in the service provider database 210. After completing the requested evaluation, the PaaS computing server 220 communicates the result back to the requesting client-specific control engine 230. Data retrieved from the databases and/or via analytics evaluation may be used, for example, to dynamically adjust the provided remote services during operation.

The client-specific control engines 230 communicate the client-specific control data to the VoIP communication server(s) using an interface protocol having an instruction format that is independent of an instruction format used to implement the client-specific control engines 230 and/or client-specific control directives.

As previously described, the independent instruction format of the interface protocol allows clients to write control directives, for example, using their preferred high-level programming and/or may be used to limit customer access and/or control over the PaaS computing server. For example, the interface protocol may be configured to allow the client-specific control engines to request analytical analysis of data in the service provider database 210 without allowing direct access to the raw data stored therein. Similarly, the client-specific control engines may be configured to request analytical analysis of data in the client database 240, without allowing direct access to the raw data stored therein.

As described with reference to FIG. 1, client-specific control engines 230 may be implemented in various locations. For example, client-specific control engines 230 for a particular client account may be implemented in the PaaS computing server(s) 220, in a separate processing circuit communicatively connected to the PaaS computing server(s) 220, using one or more processing circuits of the client, or a combination thereof.

The PaaS computing server 220 and client-specific control engines 230 may be implemented using various circuit arrangements. Block 270 shows an example implementation of a PaaS computing server configured to provide a VoIP IPBX service for a client. The example computing server 270 includes one or more IPBX server(s) 272 configured to establish and direct VoIP calls for a plurality of endpoint of a customer account. Interface circuit 274 is configured to allow different client specific control engines to communicate with the PaaS computing server 220 via a common high-level language instruction set (e.g., a set of XML instructions).

Block 280 shows an example implementation of a client-specific control engine 230. In this example, the client-specific control engine includes a storage circuit 284 configured to store control directives and/or data for one or more client accounts. Directive execution circuit 282 is configured to provide client-specific control of the remote services provided for a client via execution of the control directives for the client stored in storage circuit 284. In some implementations, the directive execution circuit 282 is configured to communicate client-specific control data to the PaaS computing server 220, for example, via interface 272, using a high-level language instruction set (e.g., a set of extensible meta-data language (XML) instructions). Additionally or alternatively, the directive execution circuit 282 may retrieve one or more sets of directives from an external source (e.g., a client database). In this example, the client-specific control engine shown in block 280 includes a directive update interface circuit 286 configured to facilitate upload and/or editing of control directives for a client account.

Figure 3:
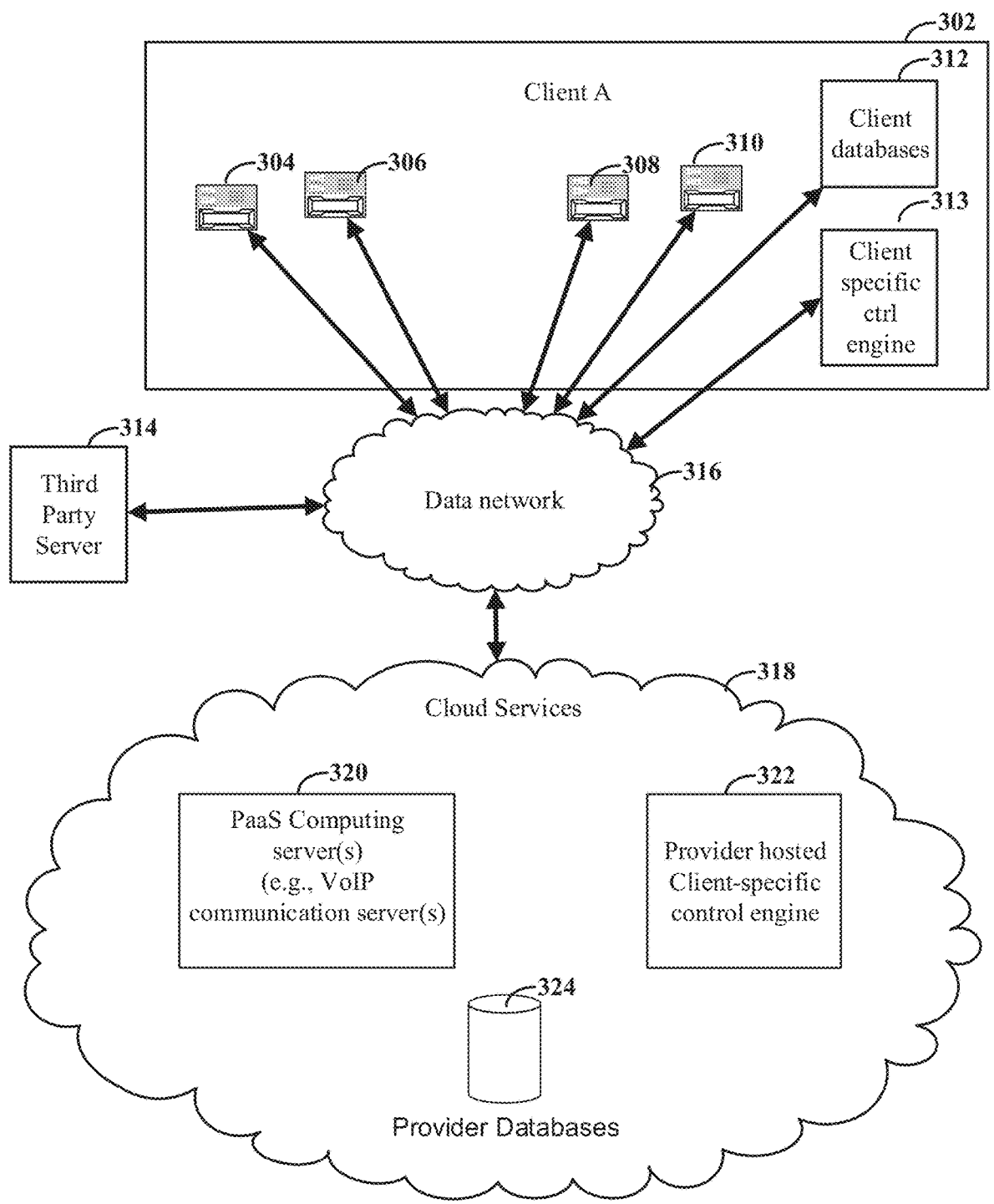
FIG. 3 is a diagram for a system that uses a high-level programming language for call control operations, consistent with embodiments of the present disclosure.

FIG. 3 is a diagram for a system that uses a high-level programming language for call control operations, consistent with embodiments of the present disclosure. In connection with these specifically-illustrated examples, VoIP endpoint devices 304, 306, 308, and 310 connected in a data network 316 are configured to place and receive VoIP telephone calls between other VoIP endpoint devices, and/or between non-VoIP endpoint devices. Non-VoIP endpoint devices may include, for example, plain old telephone service (POTS) telephones and cellular-capable devices, which might also be VoIP capable (e.g., smart phones with appropriate VoIP software applications). The various endpoint devices include circuitry that is specially configured to provide calling functions that include interfacing with the appropriate circuitry of the call service provider used by the corresponding endpoint device. In many contexts, a VoIP endpoint device is a VoIP-capable telephone commonly referred to as IP phones. The VoIP endpoint devices can include, but are not limited to, desktop computers, mobile (smart) phones, laptop computers, and tablets. When each of the endpoint devices originates or receives a call in a telephone network, each can be characterized or eferred to as an addressable call endpoint or a dial peer.

The call routing and other services for the VoIP telephone calls can be provided by one or more VoIP servers within a cloud services system 318 (e.g., configured to provide a PaaS to customers of the VoIP provider). In particular example embodiments, the VoIP servers can be located within PaaS computing servers 320, which are part of the cloud services system 318. The cloud services system 318 also includes one or more provider hosted client-specific control engines 322, configured as described with reference to 230 in FIGS. 2 and 120 in FIG. 1. A client-specific control engine 313 may also be implemented locally by a client (e.g., 302). In some embodiments, data centers can be part of a cloud-based system 318 where the hardware providing the cloud services is located in a number of different data centers with different physical locations. Consistent with embodiments, the cloud services can include SIP servers, media servers, and servers providing other services to both VoIP endpoint devices and the users of the VoIP endpoint devices. In some instances, the various servers, including both the VoIP servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a VoIP server uses session initiation protocol (SIP) to handle various call functions (e.g., call setup and tear down); however, the various embodiments discussed herein are not necessarily limited thereto. Consistent with the above and other embodiments disclosed herein, the VoIP servers can be configured to establish a leg of the call from the VoIP endpoint devices (or dial peers) to another VoIP endpoint device, or to a gateway.

According to various embodiments, one or more data analytics servers can monitor and analyze call data relating to the VoIP servers and VoIP endpoint devices. For example, a data analytics server can be designed to track call statistics about various different call-related parameters, such as call duration, call date, call time of day, called parties, endpoint devices, selected data centers, selected carriers, dropped calls, transferred calls, voicemail access, conferencing features, and others. The high-level programming language(s) and the VoIP servers executing the languages can access the call summary metrics and the data analytics, which can be stored in a provider database 324. For example, a script running the VoIP server could parse call processing XML (CPXML) documents to generate database queries that direct the VoIP server to query, or subscribe to, call length summaries for all calls made to endpoints that are registered to the VoIP server. The script could then use the information to control how calls are routed as well as how different (customer or provider) services are invoked. According to various embodiments, the database queries could be sent to a customer database 302.

Consistent with certain embodiments, the VoIP server can be configured to interface with customer servers 312, or with third party servers 314. For instance, a CPXML document stored by the cloud-based system 318 can identify, based upon a received call, a Uniform Resource Identifier (URI) that points to customer servers 312, or to a third party server 314. Control directives provided from these servers, for example, in the form of a CPXML document can be used to specify call routing, or other functions.

Figure 4:
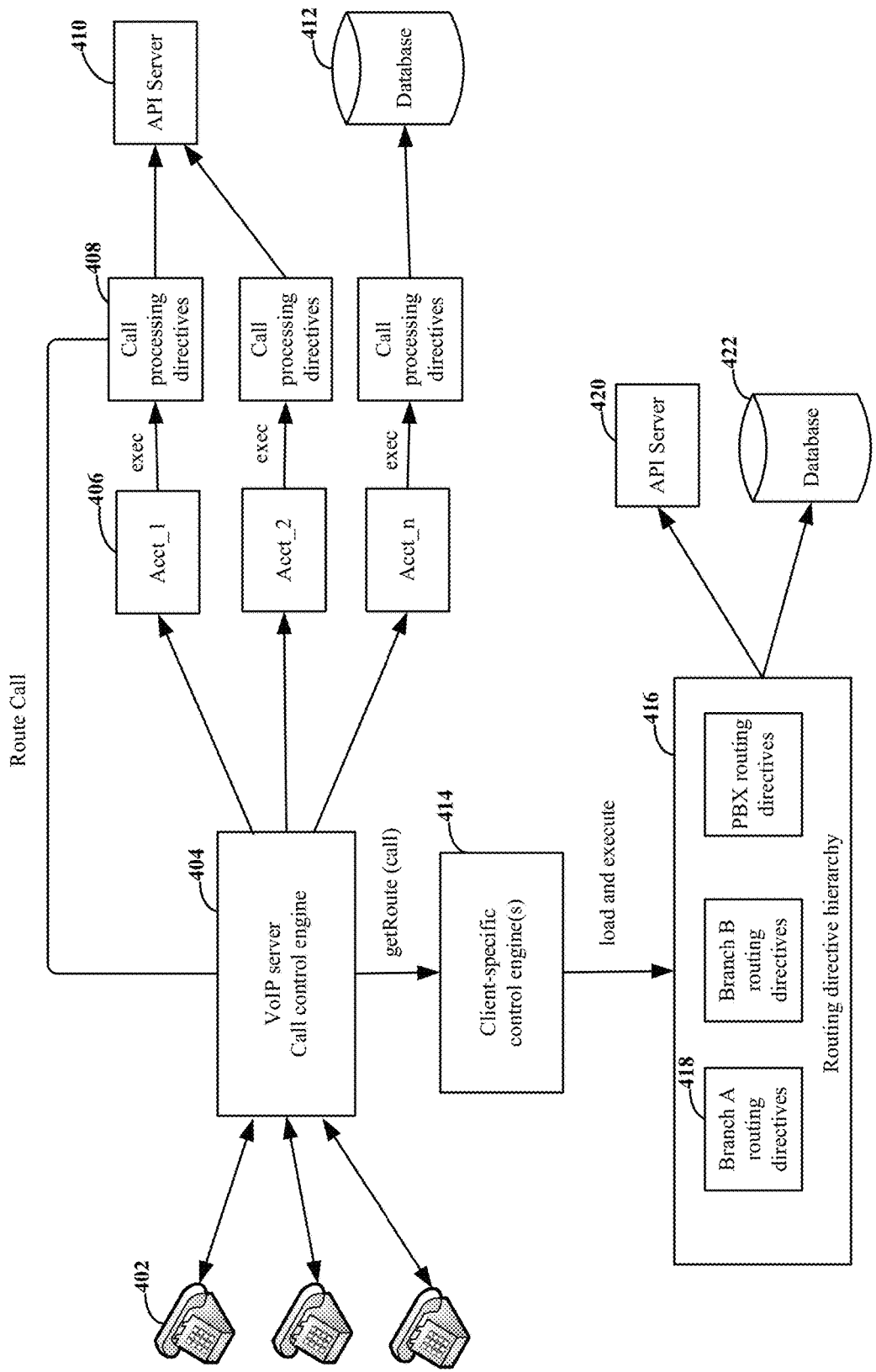
FIG. 4 is a block diagram that shows multiple conceptual layers in a call control system, consistent with embodiments of the present disclosure.

FIG. 4 is a block diagram that shows multiple conceptual layers in a call control system, consistent with embodiments of the present disclosure. The depicted configuration shows three sources of control directives 408 for call processing. The service logic executing environment 408 accesses and executes the control directives 408. The control directives 408 can be embedded as part of other call flow solutions (e.g., as part of a CTI solution), loaded locally from each of the call control servers 410 or IPBXs, or loaded from a remote web application server 416 (e.g., using with HTTP(s) protocol). The integration of the layers facilitates the ability of a developer to use the database 412, provider-hosted database(s) 422, third-party application servers, and/or third-party database(s) to drive business and call flow logic and to integrate telecommunication with other capabilities and services.

Figure 5:
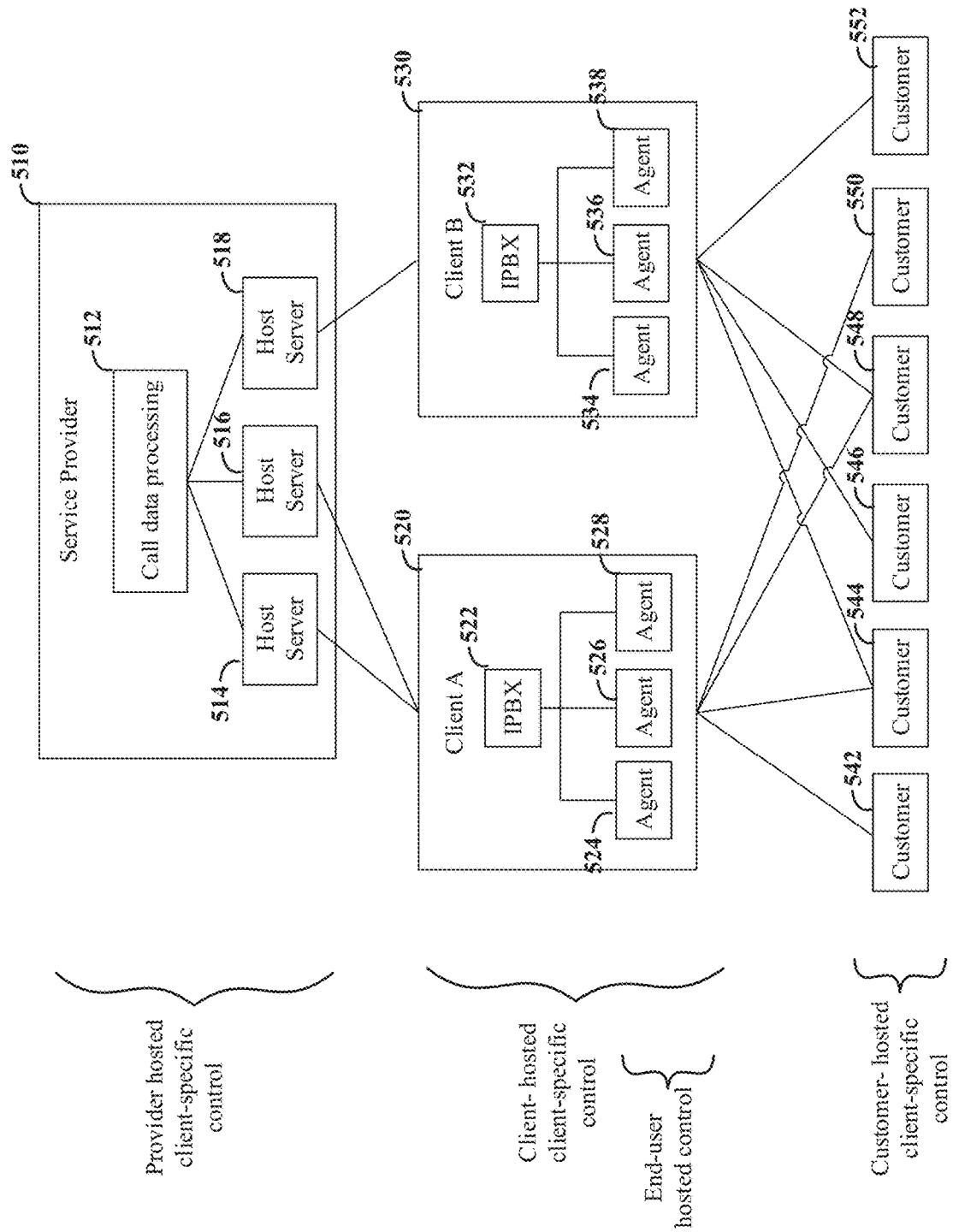
FIG. 5 shows an example hierarchy of a service provider, organizations, and customers, consistent with embodiments of the present disclosure.

FIG. 5 shows an example communication network including a VoIP communications server (e.g., 110) configured to provide respective IPBXs for a plurality of organizations. The organizations 520 and 530 provide respective products and/or services for various third-party customers 542, 544, 546, 548, 550, and 552. The VoIP service provider 510 includes a number of host servers 514, 516, and 518 configured to provide a respective IPBX server 522 and 532 for each organization (client) 520 and 530. The IPBXs 522 and 532 are configured to route calls for a plurality of end-users 524, 526, 528, 534, 536, and 538 connected to the IPBX. In certain embodiments, the end-users can be call agents for a call center. For instance, IPBX servers 522 and 532 route calls from between the call agents 524, 526, 528, 534, 536, and 538 and the third-party customers 542, 544, 546, 548, 550, and 552 of the organizations 520 and 530.

The service provider 510 also includes a call data processing circuit 512 configured to monitor the IPBX servers 522 and 532 provided by the host servers 514, 516, and 518 for the organizations 520 and 530. The call data processing circuit 512 is configured to generate data metrics in response to the call event messages generated by the IPBX servers. For each IPBX server 522 and 532, the call data processing circuit 512 may configured to evaluate the generated data metrics for one or more sets of criteria indicated in a respective policy for the IPBX server.

The data metrics generated by the call data processing circuit (and/or by other circuits shown in FIG. 5) may be used by one or more client-specific control engines for a client to adjust the IPBX services provided for the client. For instance, the data metrics and/or analytics data derived therefrom may be used to adjust routing of calls in the IPBX.

As previously described, client-specific control engines may be implemented at various client and/or service provider locations. For one client-specific control engine for a client may be implemented at the service provider 510 and a second client-specific control engine may be implemented locally by the client (e.g., by IPBX 522). If multiple IPBXs are provided for a client, each IPBX may locally implement a respective client-specific control engine. This may allow, for example, for different branches, departments, and/or franchises of a client to easily implement their own directives for controlling the provided VoIP services (for example to implement different routing policies). In some embodiments, some branches, departments, and/or franchises of a client may locally implement a client-specific control engine and/some other some branches, departments, and/or franchises of the client may configure a client-specific control engine implemented by the service provider 510 via control directives specific branches, departments, and/or franchisee. In some embodiments, an end-user (e.g., Agent) may control VoIP service provided for the particular end-user by implementing a client-specific control engine (e.g., on a computer or smart phone) or by uploading a set of control directive specific to the end-user to another client-specific control engine.

Figure 6:
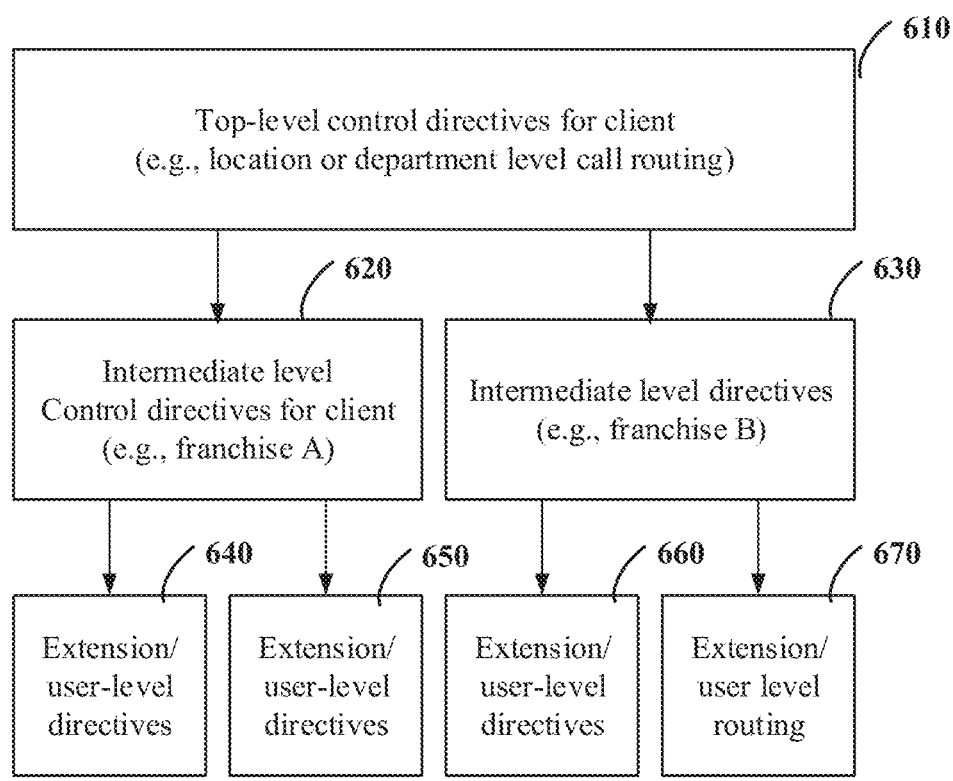
FIG. 6 is a block diagram showing an example hierarchy of control directives for client-specific control by an example client, consistent with embodiments of the present disclosure.

FIG. 6 is a block diagram showing an example set of control directives configured for multiple levels of control, consistent with embodiments of the present disclosure. In this example, block 610 provides a set of top-level control directives that are applicable to all VoIP calls for a client. Blocks 620 and 630 show a set of intermediate-level control directives that are applicable only to a subset of endpoints included in the client account (e.g., for respective IPBXs, branches, department, and/or franchisees. Blocks 640, 650, 660, 670 are shown as lower-level control directives that are applicable to particular extensions and/or end-users of the client account. The lower-level control directives may be useful, for example, for an end-user to customize and/or dynamically adjust direction of calls to an extension throughout the day.

Figure 7:
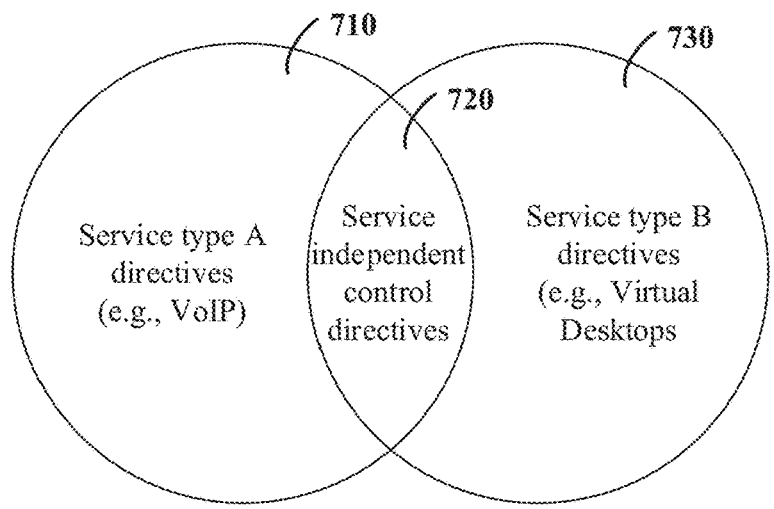
FIG. 7 shows a Venn diagram of example sets of directives for a plurality of different types of PaaS services, consistent with embodiments of the present disclosure.
Figure 8:
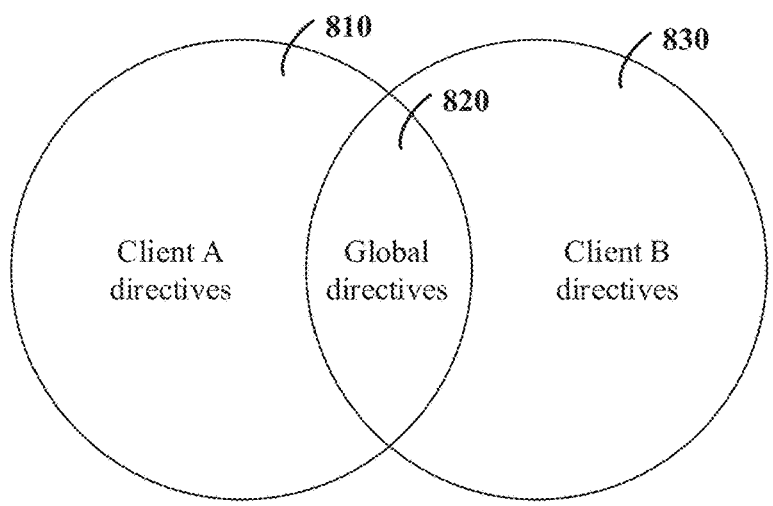
FIG. 8 shows a Venn diagram of example sets of directives for a plurality of different clients, consistent with embodiments of the present disclosure.
Figure 9:
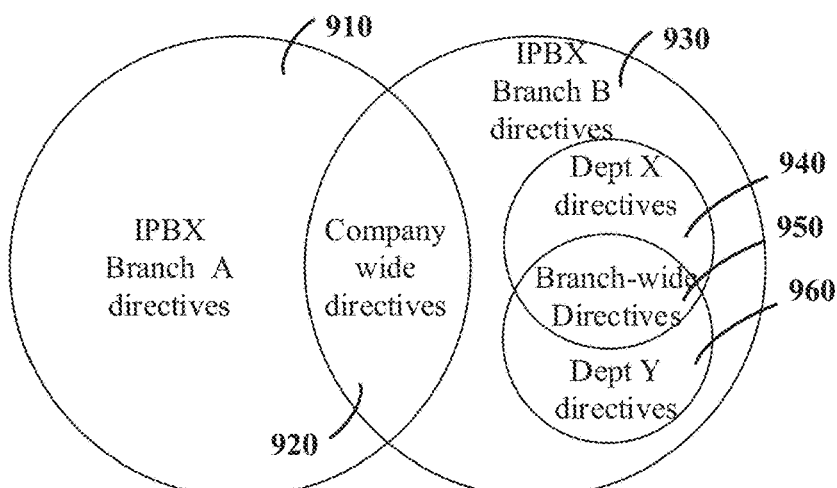
FIG. 9 shows a Venn diagram of example sets of directives for a plurality of different branches and departments of a client, consistent with embodiments of the present disclosure.

FIGS. 7, 8, and 9 demonstrate the ability to configure different sets of control directives to customize remote services based on the needs of different clients. FIG. 7 shows a Venn diagram of example sets of directives for a plurality of different types of PaaS services, consistent with embodiments of the present disclosure. In this example, a first set of control directives 710 are only applicable and used to control adjustment of a particular type of service (e.g., VoIP). A second set of control directives 730 are only applicable and used to control adjustment of another particular type of service (e.g., Virtual desktop service). A third set of control directives 720 are applicable and used to control adjustment multiple different services (e.g., VoIP and Virtual desktop service).

FIG. 8 shows a Venn diagram of example sets of directives for a plurality of different clients, consistent with embodiments of the present disclosure. In this example, a first set of control directives 810 are only applicable and used to control adjustment of one or more services for a first client (client A). A second set of control directives 830 are only applicable and used to control adjustment of one or more services for a second client (e.g., client B). In some embodiments, a service provider may implement a third set of control directives 820 that are applicable and used to control adjustment of the one or more services for multiple clients.

FIG. 9 shows a Venn diagram of example sets of directives for a plurality of different IPBX branches and departments of a client, consistent with embodiments of the present disclosure. In this example, a first set of control directives 910 are only applicable and used to control adjustment of VoIP service in an IPBX of a first branch of a client (Branch A). A second set of control directives 930 are only applicable and used to control adjustment of VoIP service in an IPBX of a second branch of a client (Branch B). A third set of control directives 920 are applicable and used to control adjustment of VoIP service in the IPBXs of both branches A and B. In this example, Branch B also includes sets of intermediate level instructions for two departments X and Y. A first set of intermediate-level control directives 940 are only applicable and used to control adjustment of VoIP service in a first department X. A second set of intermediate-level control directives 960 are only applicable and used to control adjustment of VoIP service in an IPBX of a second department Y. A third set of intermediate-level control directives 950 are applicable and used to control adjustment of VoIP service for both departments X and Y of branch B.

Figure 10:
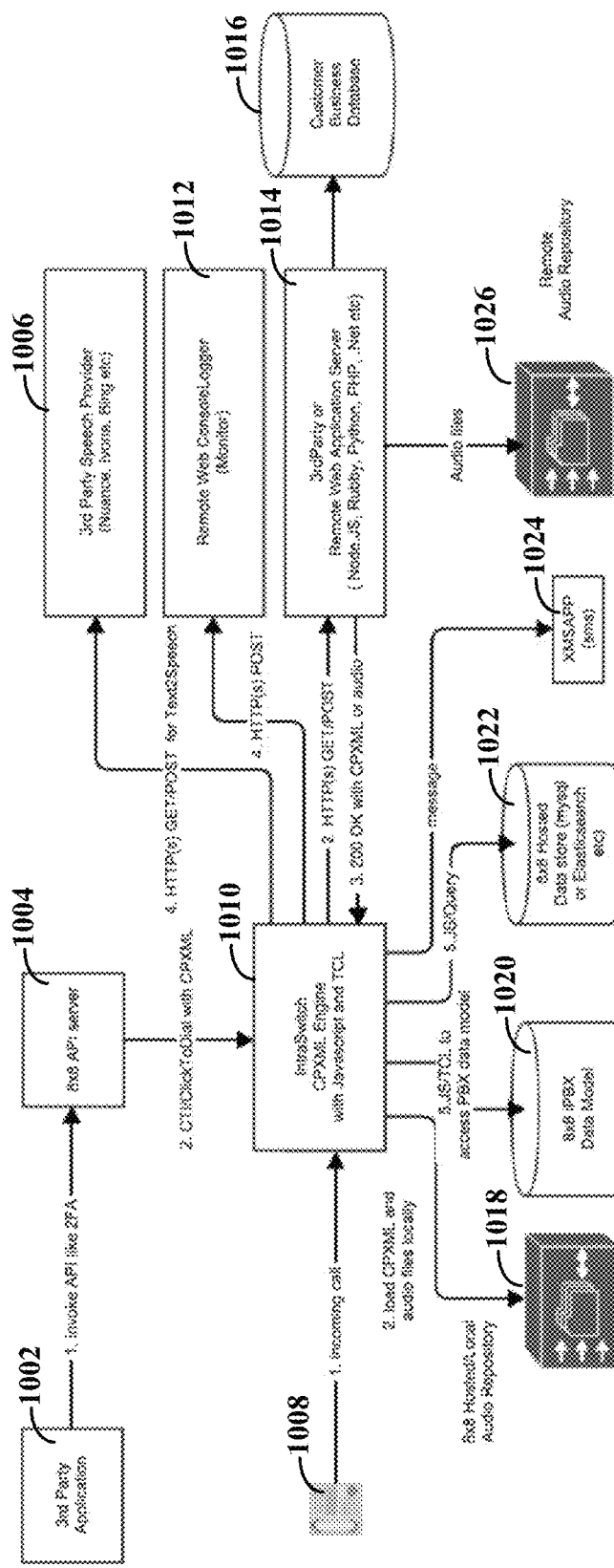
FIG. 10 is a block diagram of a system that provides multiple VoIP-related functions in cooperation with call control engines or servers, consistent with embodiments of the present disclosure.

FIG. 10 is a block diagram showing interconnections to a call routing switch, consistent with embodiments of the present disclosure. As a particular, non-limiting example, an incoming call, from a telephone device 1008, is received by the call control engine 1010. The call control engine 1010 can use the call destination to invoke a proper VoIP call services (e.g., CTI functionality), which in some instances can be provided by a third party application server 1002 through a VoIP provider's API server 1004. The CPXML documents can be embedded within the CTI service data. Alternatively, CPXML documents can be loaded from a database 1022, which might be hosted by the VoIP provider as part of the PaaS solution. A third option is for the CPXML documents to be retrieved from a customer database 1016. For example, the CPXML documents could be retrieved using an HTTP connection to a web application server 1014.

At the same time that the CPXML documents are retrieved, additional information can also be provided, such as audio files 1018, 1026. The audio files could be used for various purposes, such as for implementing an auto attendant feature.

In various embodiments, a customer can use databases and other data sources that are offered by the VoIP provider without having direct access to the data. Rather, the customer can use the CPXML to generate queries that identify a data source and a conditional response based upon the query results. The call control engine can carry out the conditional response based upon the results of the query without the customer every receiving, or otherwise having access to, the data driving the conditional response. A particular example might be a query to a call analytics database for the VoIP provider. A customer could be given the limited, indirect access to the database through CPXML-driven queries while the VoIP provider maintains control over the proprietary contents of the database. Moreover, the database might contain information about individual callers that would raise privacy concerns.

In some instances, the customer can provide the data sources to the VoIP provider and the call control engine without providing direct access to the data. For example, the customer can specify, in a CPXML document, a URI that points to a customer-provided server and an associated query. The customer-provided server can execute, for example, a local script that may rely upon customer data. The script can generate a response in the form of a CPXML document. The call control engine can then carry out call routing, or other functions, based upon the response and without ever having direct access to the customer data.

In certain embodiments, the call control engine 1010 can provide call processing information to a monitor server 1012 (e.g., a remote web console logger application). The call control engine 1010 can then execute the CPXML documents. In an example implementation, the CPXML document might invoke various other services, such as a text-to-speech application 1006. For example, a CPXML document might specify that a string of text be converted to speech using a corresponding command (e.g., "<say>Hello, please hold. </say>"). The CPXML document can also request access to various other data sources, such as IPBX data model 1020 and a hosted data storage 1022. Further, the CPXML document can specify that an SMS/MMS text message be sent using XMSApp 1024 or generate new calls (e.g., for call conferencing or call forking). The provided examples of capabilities using CPXML documents are not limiting.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (VoIP) endpoint device (or endpoint) includes a communication circuit and (computer) processing circuits which are configured to establish (VoIP) communication sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A method for use in a system to provide remote data communications services, to different sets of endpoint devices respectively associated with each of a plurality of disparate client entities, over the Internet via a data communications server, wherein each of the endpoint devices includes Internet-enabled communications circuitry, the method comprising:

for certain of the remote data communications services for at least one of the different sets of endpoint devices respectively associated with one of a plurality of disparate client entities, a CPU operated on behalf of a service provider configuring at least some of the remote data communications services according to first instructions written in a first instruction language;

receiving over the Internet and at the data communications server, a set of second instructions: that are written in a second instruction language which is different than and partly in common with the first instruction language, that is conveyed to the data communications server on behalf of said at least one of the different sets of endpoint devices, and that specific to further configuring the data communications services for said at least one of the different sets of endpoint devices; and based on the first instructions written in a first instruction language and on the set of second instructions, configuring the data communications server for providing said certain of the remote data communications services for said at least one of the different sets of endpoint devices, and then providing the remote data communications services to said certain of the remote data communications services for said at least one of the different sets of endpoint devices.

2. The method of claim 1, wherein the set of second instructions are associated with client-specific instructions specified on behalf of said one of a plurality of disparate client entities.

3. The method of claim 1, wherein the first and second instruction languages are related to each other in that the first instruction language is characterized by a first set of programming instructions and the second instruction language is characterized by a different set of programming instructions that is a subset of the first set of programming instructions.

4. The method of claim 1, wherein the first instruction language is used for characterizing control call routing decisions on behalf of said one of a plurality of disparate client entities and wherein the second instruction language is used for characterizing data or call processing associated with the data communications services that are specific to said one of a plurality of disparate client entities and specified, via the set of second instructions, by or on behalf of said one of a plurality of disparate client entities.

5. The method of claim 1, wherein the first instruction language is used for characterizing control call routing decisions, on behalf of said one of a plurality of disparate client entities, for high volumes of call traffic that occur at an edge of a communications system that is operated by the service provider and that includes the data communications server.

6. The method of claim 1, wherein the first instruction language is used for characterizing control call routing decisions, on behalf of said one of a plurality of disparate client entities, for providing the data communications server call routing information for a particular branch office.

7. The method of claim 1, wherein the first instruction language is used for characterizing control call routing decisions, on behalf of said one of a plurality of disparate client entities, for providing the data communications server call routing information for a particular IPBX of one of a plurality of disparate client entities.

8. The method of claim 1, wherein the first instruction language is used for characterizing control call routing decisions for providing the data communications server call routing information for a particular IPBX of one of a plurality of disparate client entities, wherein the particular IPBX includes or provides documents that are written in the second instruction language and that are associated with said certain data communications services which the service provider uses to associate with a particular account.

9. The method of claim 1, wherein the first instruction language is used for characterizing control for call routing decisions for providing the data communications server call routing information via a high-level template associated with a set of multiple accounts used by the service provider, and wherein the second instruction language is used for characterizing call routing decisions associated with a subset of the multiple accounts including less than all in the set of multiple accounts.

10. The method of claim 9, wherein said subset of the multiple accounts refers to a single account.

11. The method of claim 9, wherein said subset of the multiple accounts refers to a more than one account.

12. The method of claim 1, wherein the first instruction language is used for characterizing control call routing decisions used by the data communications server on behalf of said one of a plurality of disparate client entities, and wherein the second instruction language is provided on behalf of the at least one of the different sets of endpoint devices respectively associated with one of a plurality of disparate client entities and used by the data communications server to provide individual customizable options for the at least one of the different sets of endpoint devices.

13. The method of claim 1, wherein the first instructions written in a first instruction language are associated with a group of accounts including said one of a plurality of disparate client entities and another of the plurality of disparate client entities, and wherein each of said one and said another of the plurality of disparate client entities uses its own set of second instructions to specify or configure the remote data communications services.

14. The method of claim 1, wherein the first instructions written in a first instruction language are associated with a group of accounts, including said one of a plurality of disparate client entities and another of the plurality of disparate client entities, to specify call processing functionality common to each said one of a plurality of disparate client entities and another of the plurality of disparate client entities.

15. The method of claim 14, wherein for said one and said another of the plurality of disparate client entities, respectively unique sets of template control directive documents as written in the second instruction language are provided to the data communications server to specify or configure the remote data communications services in order to specify, for each of said one and said another of the plurality of disparate client entities, different processing instructions that are differentiated by country or region.

16. The method of claim 14, wherein for said one and said another of the plurality of disparate client entities, respectively unique sets of template control directive documents as written in the second instruction language are provided to the data communications server to specify or configure the remote data communications services in order to specify, for each of said one and said another of the plurality of disparate client entities, different processing instructions that are differentiated by a different group, branch or store of the company.

17. The method of claim 1, wherein the first and second instruction languages are configured to provide the data communications server in a manner that is scalable with the first instruction language being configured for use with at least one template that is common to each of the plurality of disparate client entities and the second instruction language being configured for use with at least one other template to be customized by each of the plurality of disparate client entities for the data communications specific to the respective ones of the plurality of disparate client entities.

18. The method of claim 1, wherein the second instructions written in the second instruction language are configured to correspond with a scriptable computer programming language and further configured to constrain, via a set of valid commands, operations that can be carried out by the data communications server to provide remote data communications services.

\* \* \* \* \*